US009539796B2

(12) United States Patent
Bischof et al.

(10) Patent No.: US 9,539,796 B2
(45) Date of Patent: Jan. 10, 2017

(54) METHOD AND DEVICE FOR APPLYING A STRIP-SHAPED MATERIAL ONTO AN OBJECT

(71) Applicants: Thomas Bischof, Aachen (DE); Harald Danz, Wuerselen (DE)

(72) Inventors: Thomas Bischof, Aachen (DE); Harald Danz, Wuerselen (DE)

(73) Assignee: REIS GROUP HOLDING GmbH & Co. KG, Obernberg (DE)

( * ) Notice: Subject to any disclaimer, the term of this patent is extended or adjusted under 35 U.S.C. 154(b) by 436 days.

(21) Appl. No.: 14/051,667

(22) Filed: Oct. 11, 2013

(65) Prior Publication Data
US 2014/0102614 A1 Apr. 17, 2014

(30) Foreign Application Priority Data

Oct. 15, 2012 (DE) ........................ 10 2012 109 804
Jan. 15, 2013 (DE) ........................ 10 2013 100 397

(51) Int. Cl.
*B65H 37/00* (2006.01)
*B32B 37/00* (2006.01)
(Continued)

(52) U.S. Cl.
CPC .......... *B32B 37/0046* (2013.01); *B23P 19/047* (2013.01); *B65H 35/0013* (2013.01);
(Continued)

(58) Field of Classification Search
None
See application file for complete search history.

(56) References Cited

U.S. PATENT DOCUMENTS 4,401,503 A * 8/1983 Hertel .................... B31F 5/085
156/201
5,779,830 A 7/1998 Wakefield et al.
(Continued)

FOREIGN PATENT DOCUMENTS

DE 3878287 T2 7/1993
DE 69503548 T2 3/1999
(Continued)

OTHER PUBLICATIONS

European Search Report issued on Jan. 30, 2014, corresponding to European Patent Application No. EP 13188455.
(Continued)

*Primary Examiner* — Barbara J Musser
(74) *Attorney, Agent, or Firm* — Ladas & Parry LLP

(57) ABSTRACT

The invention relates to a method and a device for applying a strip-shaped material (28) onto a contact area (60) of an object that is limited by at least one second section emanating from the first section, whereby the strip-shaped material is applied in a direction of application (70) onto the contact area by a pressure element (30) and the pressure element emanates from a pivotable pivoting element (20) that is connected to a holder. In order to make a completely automated application of the strip-shaped material onto the object possible, it is suggested that the actively pivotable pivoting element (20) is pivoted during the application of the strip-shaped material (28) onto the contact area (60) in and/or counter to the direction of application (70) and executes a lifting movement during the course of the pivoting movement.

24 Claims, 6 Drawing Sheets

Figure 1:
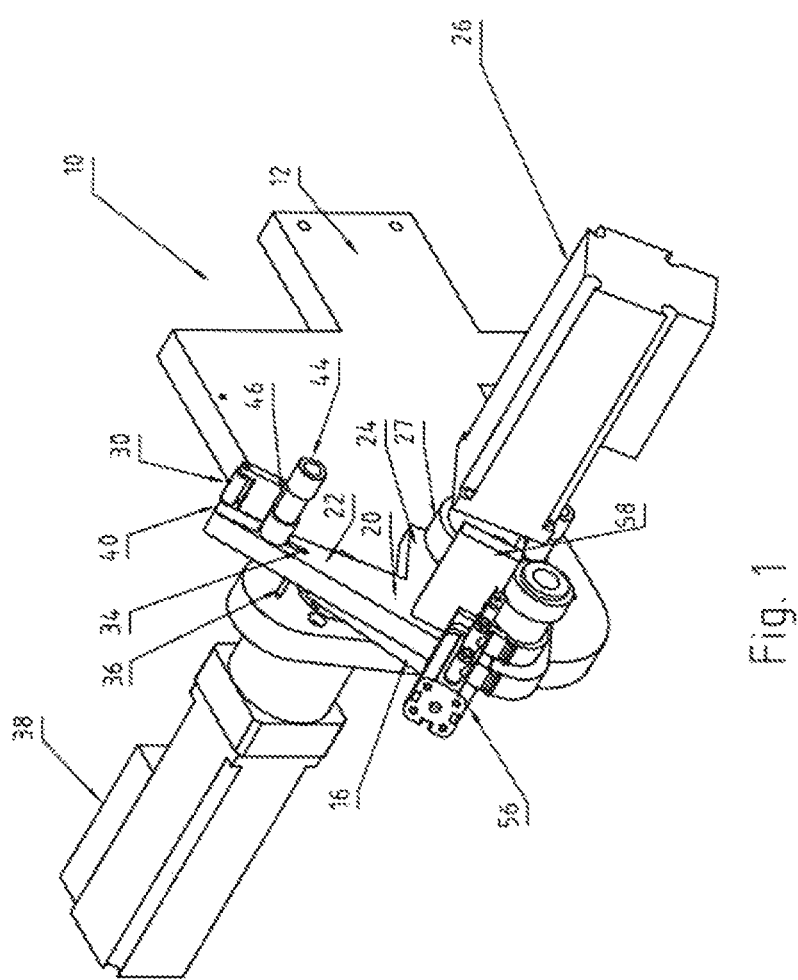

(51) Int. Cl.
    *B23P 19/04*         (2006.01)
    *B65H 35/00*        (2006.01)

(52) U.S. Cl.
    CPC .......... *B65H 37/002* (2013.01); *Y10T 156/10* (2015.01); *Y10T 156/12* (2015.01); *Y10T 156/17* (2015.01)

(56) References Cited

U.S. PATENT DOCUMENTS

| | | | |
|---|---|---|---|
| 6,634,401 B2 | 10/2003 | Kuhn et al. | |
| 6,808,581 B2 | 10/2004 | Kuta et al. | |
| 6,852,186 B1* | 2/2005 | Matsuda ............ | B65H 35/0013 156/230 |
| 2010/0175836 A1* | 7/2010 | Lam .................. | B65H 35/0013 156/468 |

FOREIGN PATENT DOCUMENTS

| | | |
|---|---|---|
| DE | 102004021622 B3 | 9/2005 |
| EP | 0286343 B1 | 2/1993 |
| EP | 0676352 B1 | 7/1998 |
| GB | 2101519 A | 1/1983 |
| GB | 2486230 A | 6/2012 |
| WO | 2010/097458 A1 | 9/2010 |

OTHER PUBLICATIONS

European Search Report issued Apr. 16, 2014, corresponding to European Patent Application 13188455.

* cited by examiner

METHOD AND DEVICE FOR APPLYING A STRIP-SHAPED MATERIAL ONTO AN OBJECT

The invention relates to a method for applying a material, in particular a strip-shaped material, onto a contact area of an object, in particular onto a first section such as shanks of a frame that is limited by at least one second section such as a shank emanating from the first section or limiting the latter, whereby the strip-shaped material is applied in an application direction by a pressure element onto the contact area and the pressure element emanates from a pivotable pivoting element or is a section of the latter that is connected to a holder.

The invention also relates to a device for the application of a material, preferably a strip-shaped material, in particular an adhesive band with a liner, onto a contact area of an object, in particular an object such as a frame comprising at least one inner corner, comprising a holder that can move relative to the object,
a first drive for transporting the strip-shaped material,
a pressure element emanating from a pivot element to which pressure element the strip-shaped material can be supplied by the first drive and by which the strip-shaped material can be applied onto the contact area by pressure loading, whereby the pivot element is connected to the holder,
and optionally a cutting device.

A device for applying an adhesive band can be gathered from DE-T-695 03 548 (EP-B-0 676 352). Here, an adhesive band is applied by a driven vacuum wheel onto a material web. The speed of the material web is determined by a CPU in order to then drive the vacuum wheel after the acceleration required at first with the same speed. For the acceleration of the vacuum wheel required for the synchronization the length of the adhesive band applied on the vacuum must be smaller than the circumference of the vacuum.

DE-B-10 2004 021 622 refers to a device and to a method for applying an adhesive band. For this, the adhesive band is grasped between rollers and dawn off under tension from a supply roller in order to be aligned on an object such as an edge or paper roll to be brought up. After the alignment of the adhesive band on the object the adhesive band is pressed onto it. During the approach of the rollers they execute a lifting movement.

The subject matter of DE-T-38 78 287 (EP-B-0 286 343) is a device for the application of an adhesive band onto a product. In order to be able to apply the adhesive band substantially free of tension, it is run over a dancer roller. Furthermore, there is the possibility of varying the speed of the application as a function of the occurring tension.

According to WO-A-2010/097458 an object to be adhered is transported by a handling device, whereby the course of the speed and of the acceleration of the object is synchronously transferred via a shaft of the handling device onto the transport of the adhesive band. The latter is guided over a transport station serving as a holder for rollers, whereby one other rollers is constructed as a pressure roller via which the adhesive band is pressed onto the object. The transport station can be pivoted in order to separate a section of the adhesive band after a perforation that took place previously.

GB 2 101 519 A relates to a device for applying a band onto an object. A gantry is provided here that extends over the object to be provided with the band and along which a device carrying the band can move, which device can be adjusted in the Z direction. The device can also be pivoted about the Z axis.

U.S. Pat. No. 6,634,401 has as subject matter a device and a method for applying an adhesive band onto a surface of an object such as a glass plate. For this, a pressure roller emanates from a first arm that is connected for its part to a second arm that can pivot about a shaft. The first arm can execute a lifting movement by means of an actuator in order to compensate irregularities on the surface.

According to U.S. Pat. No. 6,808,581 and adhesive band is applied onto a material roll by a pressure roller. The pressure roller emanates from a pivot lever.

U.S. Pat. No. 5,779,830 relates to an application device for a flexible band. Here, an applicator head emanates from a robotic arm. A band to be applied onto an object is pressed onto the object by a pressure roller that can rotate about a shaft that emanates from a guide block that can be vertically adjusted.

In order to insert panes in window frames they are usually held with clamps. Since only a punctiform support takes place, the frames must have a sufficient rigidity. It would be desirable if the pane were first connected circumferentially to the frame shanks on the circumference side during the mounting so that the frames can be more easily constructed. In order to insert appropriate adhesive strips into the frame, however, an automatic fastening of the adhesive strips relative to the corners can only be achieved with difficulty, so that either the corners are left out or a manual working is required.

The present invention has the problem of further developing a method and a device of the initially cited type in such a manner that a fully automated application in particular of a strip-shaped material onto an object, in particular an adhesive band with a liner can be applied in a frame, whereby an automated application should be possible in corner areas or recesses.

The problem is solved in accordance with the invention in that the pivoting element is pivoted during the application of the strip-shaped material onto the contact area in and/or counter to the direction of application and that a lifting movement is performed during the course of the pivoting movement. During this time the material is in contact with the object during the superposed pivoting-/lifting movement.

The pivoting movement of the pivoting element is carried out indirectly or in a directly active manner by a drive.

The invention provides that the strip-shaped element is guided around a pressure element such as a pressure roller of a pivot element that can be pivoted relative to the direction of application of the strip-shaped material in the direction of the latter or counter to the latter during the application of the material so that corners or recesses in the object can be provided without problems with the strip-shaped material, that is, in particular, in the case of window frames an adhesive band can also be completely introduced into the corners. This is made possible by the pivoting of the pivot element that leads or trails the latter in reference to a zero position as a function of the pivoting position. The pivoting during the application is also to be understood in such a manner that a pivoting takes place only at times.

The superpositioning of the pivoting and linear movement by which a stroke is made possible ensures that the holder comprising the pivoting element does not have to deviate from the object by the pivoting of the pivoting element so that a smooth guidance and therefore a controllable relative movement is ensured between the object and the holder. The linear- or lifting movement of the pivoting movement can be realized by an eccentric movement of the pivoting element or by an adjusting of the holder itself.

The pivoting angle—starting from a 0° position—can be between −80° and +80°. +80° means that the pivoting lever is pivoted in the direction of application, and −80° means that the pivoting lever is pivoted counter to the direction of application of the material to be placed on the object. In the starting position the pivoting lever runs vertically to a section of the object which section runs in a straight line, and thus coincides with the normal of the section. This represents the 0° position. The pivoting element is preferably pivoted through an angle between +45° and −45°.

The preferred stroke length, that is, the stroke, is between +10 mm and −10 mm, preferably between +6 mm and −6 mm. The 0° position is again the one at which the pivoting element and the force acting on the material to be applied runs vertically to a section running in a straight line, that is, to its normal. In this base position the stroke length is defined with 0 mm.

In order to ensure that regardless of the pivoting of the pivoting element the material such as adhesive band is applied such as adhered onto the object without tension or always with a desired given tension, a suggestion of the invention that is to be emphasized and that constitutes an inventive suggestion of the inventor provides that the strip-shaped material is transported by a drive to the pressure element and that the transport length is regulated as a function of the relative movement between the holder and the contact area and of the pivoting movement during the pressure contact between the pressure element and the contact area.

The strip-shaped material is actively transported, whereby the strip-shaped material applied onto an object corresponds per unit of time to the path stretch in the unit of time that is traversed due to the relative movement between the object and the holder with inclusion of the pivoting movement.

If the pivoting element is pivoted in the direction of application, the drive for the transport of the strip-shaped material is regulated in such a manner that in addition to the stretch traversed on account of the relative movement between the object and the holder per unit of time the stretch of the pressure element relatively traversed in the same unit of time in the direction of application is taken into account so that as a consequence a greater length of strip-shaped material must be supplied to the pressure element then if a pivoting movement were not to take place. Accordingly, the length of the strip material to be transported is reduced if the pivoting element is pivoted counter to the direction of application during the relative movement between the object and the holder.

In particular, it is provided that the holder and/or the object is/are moved by a manipulating device and that the drive for the transport of the strip-shaped material is regulated by the controlling of the manipulating device. In particular, the holder is adjusted during the application in the case of a stationarily positioned object.

In order to make possible a pivoting—and linear movement of the pivoting element, it is provided in particular that the pivoting element is pivoted on the one hand about a shaft emanating from a pivoting arm emanating from the holder and on the other hand is guided is guided by a projection emanating from the holder and engaging in a longitudinal slot present in the pivoting element.

The invention alternatively provides that the pivoting element can pivot about a shaft emanating from the holder and that the lift required during the pivoting is realized via the holder by an actuating element such as a cylinder, spring or spindle.

A device of the initially cited type is distinguished in that the pivoting element can pivot about a first shaft emanating from the holder and that the holder can be adjusted in its distance transversally to the contact area, or that the pivoting element can pivot about a second shaft emanating from a pivoting arm that emanates from the holder and can pivot about a third shaft, and that the pivoting element comprises a longitudinal slot through which a projection emanating from the holder runs, whereby the longitudinal slot runs in such a manner relative to the contact area that the pivoting element loads the pressure element with pressure in the direction of the contact area independently of its position via the pressure element for applying the strip-shaped material. The superposed lift-/pivoting movement made possible by the alternative constructive solutions then takes place when the material makes contact with the object in particular in corner areas or recesses of the object without the contact between the material and the object being interrupted.

The device in accordance with the invention makes it possible that corners of recesses of an object can be provided with the strip-shaped material, in particular with an adhesive band, whereby the required pressure-loading in the recesses and/or corners takes place by the pivoting element, i.e., of the pressure element such as a pressure roller emanating from this pivoting element. This is ensured in that the pressure roller can be pivoted to the desired extent to the object or its contact area about the first or second shaft. The pressure element can pressure-load the strip-shaped material in the direction of the contact area in front of or behind the first or second shaft viewed in the direction of the application of the strip-shaped material.

In order to ensure a uniform or substantially uniform contact with the object in spite of the pivoting, that results in a circular sectional movement of the pressure element on account of the pivoting of the pivoting element about the first or second shaft, the pivoting element is adjusted in a linear manner as a function of the pivoting position. This can take place on the one hand in that the holder itself exerts a lift. However, this can also take place by means of spring support, a pressure cylinder or spindle drive.

However, the superposed rotary- and linear movement is preferably realized by the pivoting element itself in that the pivoting element performs an eccentric movement. This is made possible in that the pivoting element is pivoted about the second shaft, that emanates from the pivoting arm that can pivot about a third shaft emanating from the holder, and performs a linear movement in a superposed manner in that a projection such as a pin engages into a longitudinal slot and emanates from the holder. The longitudinal slot runs in particular in the connection line or approximately the connection line between the second shaft and the pressure element.

Furthermore, it should be stressed that the object and/or the holder is/are adjustable by a manipulating device and that the first drive can be regulated by its control as a function of the relative movement between the object and the holder as well as by the pivoting movement of the pivoting element during the application of the strip-shaped material.

The transport means for the strip-shaped material is another strip-shaped material that is connected to the latter and that is in particular a liner. In order that this material or liner is not noticeably stretched, after the strip-shaped material has been applied onto the object or its contact area, it is provided in particular that the first drive emanates from the pivoting element.

Furthermore, the invention provides in particular that the cutting device emanates from the pivoting element. Thus, there is the possibility of also applying short sections since the distance between the pressure element and the cutting device can be relatively short. The cutting device can also optionally emanate from the holder.

The pivoting arm itself can pivot via a second drive that also emanates from the holder.

If the application of an adhesive band onto an object such as into the shank of a frame such as a window frame is viewed as the preferred application of the teaching in accordance with the invention, the teaching in accordance with the invention is not limited to it. Thus, for example, a sealing strip can be applied into or pressed into a frame or a strip-shaped material can be applied into or pressed into a groove. The sealing strip or the strip-shaped material should also be transported by a carrier material such as a carrier band or carrier strip.

More details, advantages and features of the invention result not only from the claims, the features to be gathered from them by themselves and/or in combination, but also from the following description of preferred exemplary embodiments to be gathered from the drawings.

Figure 2:
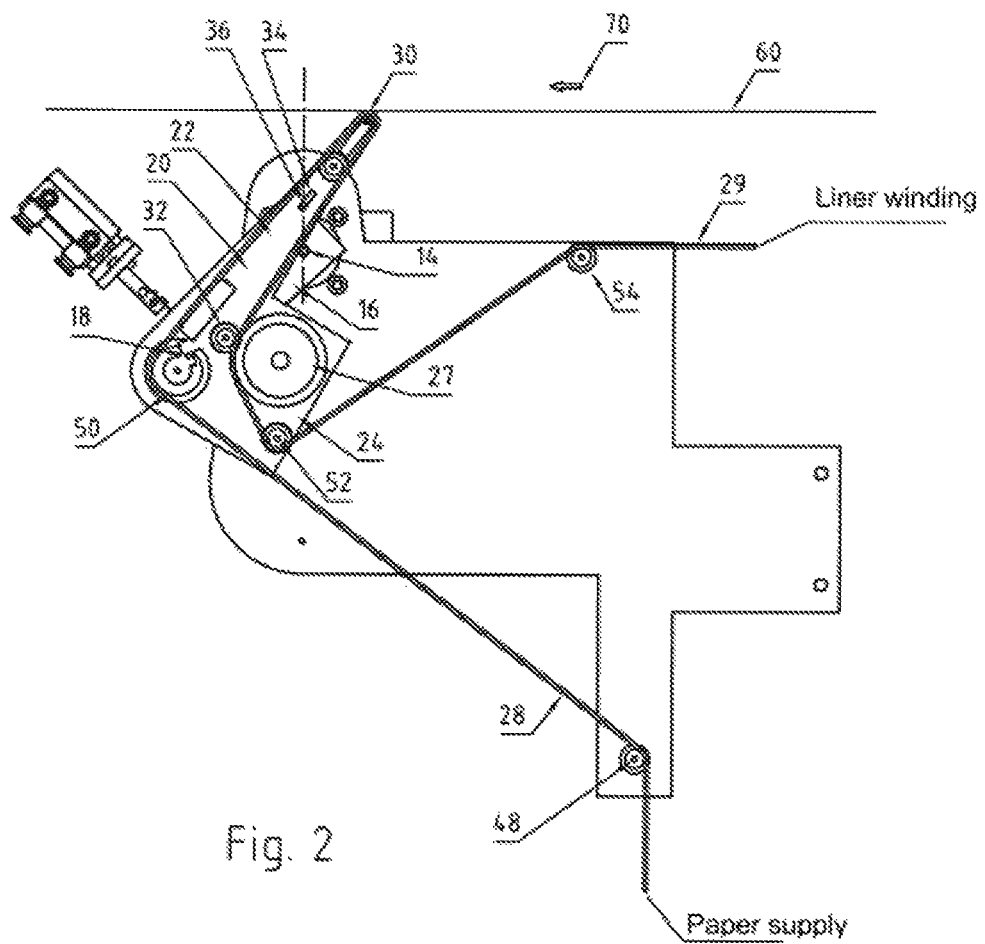
Figure 3:
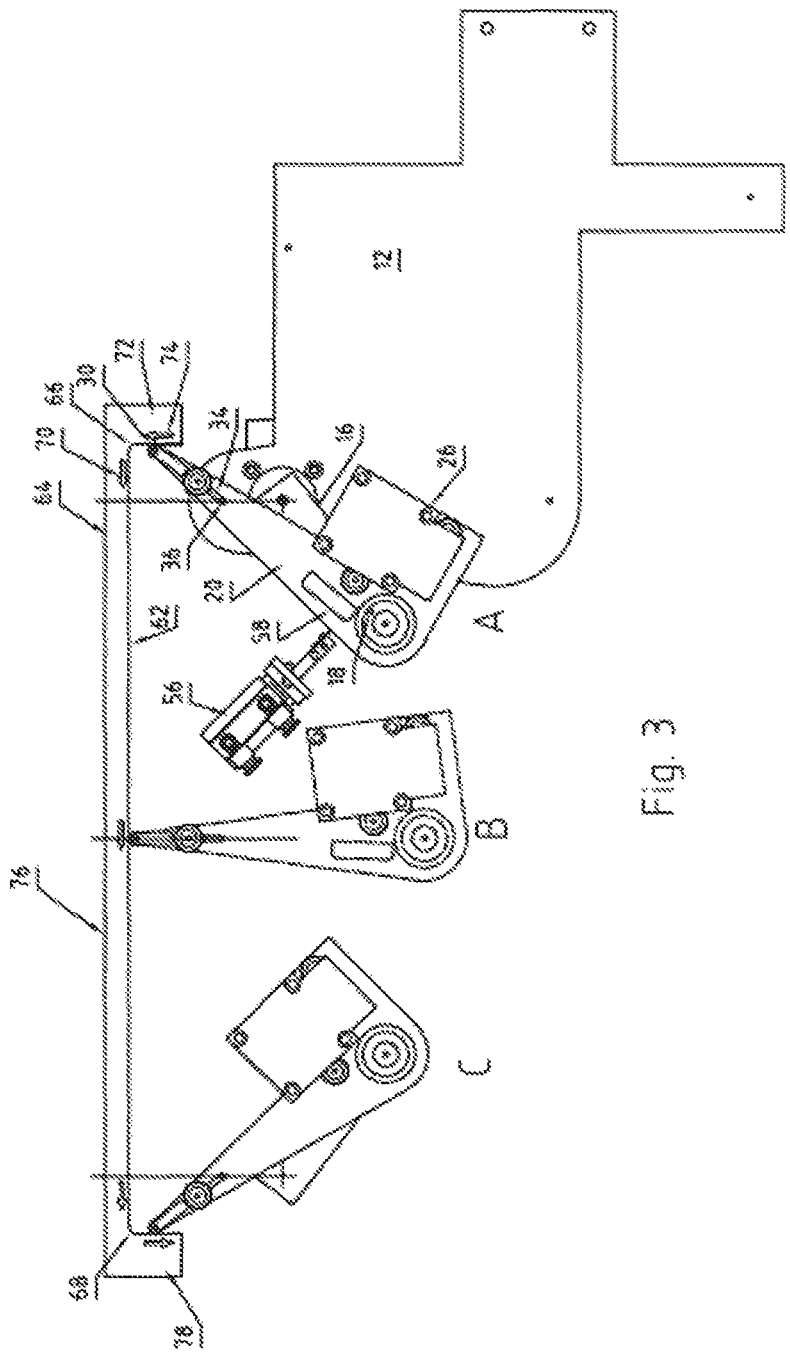
Figure 4:
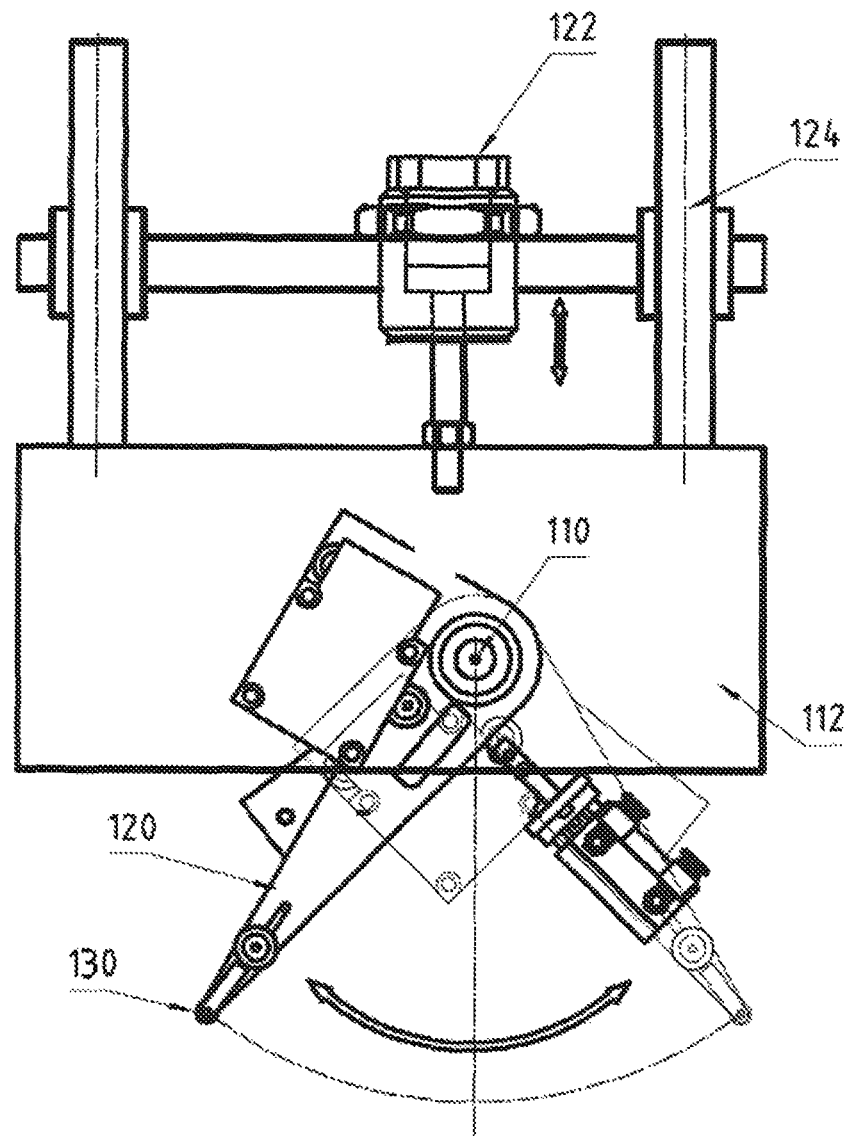
Figure 5:
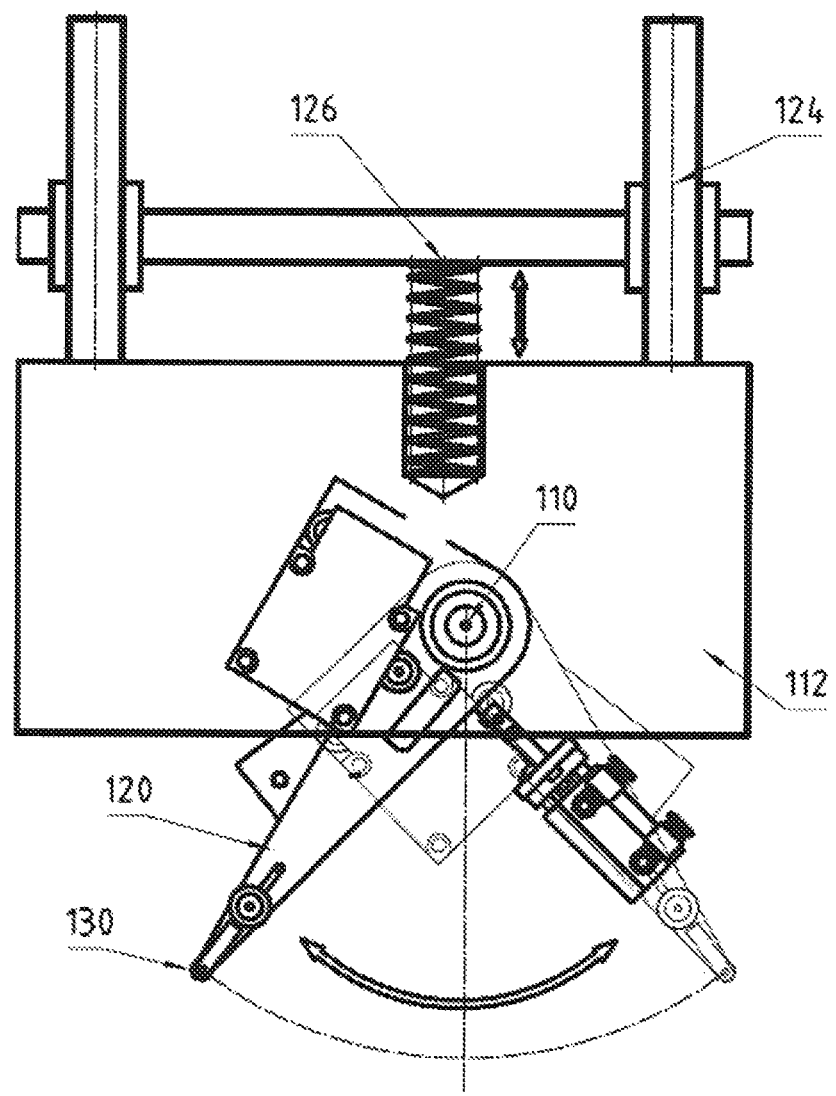
Figure 6:
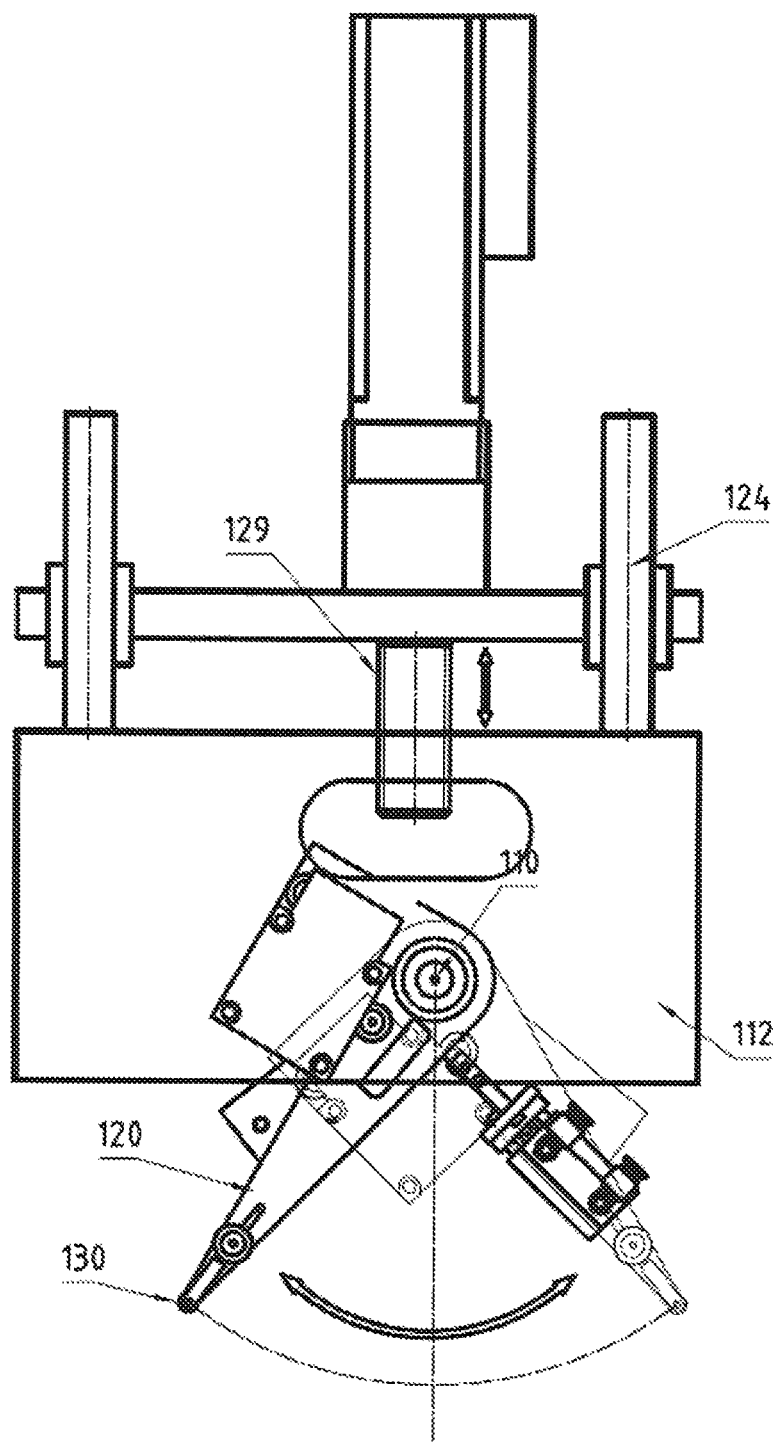

In the figures:

FIG. 1 shows a front view for applying strip-shaped material,

FIG. 2 shows a lateral view of the representation according to FIG. 1 in a basic view with strip-shaped material, FIG. 3 shows a basic view of an insert of the device for the application of strip-shaped material, FIG. 4 shows a second embodiment of a device in accordance with the invention, FIG. 5 shows a third embodiment of a device in accordance with the invention and FIG. 6 shows a fourth embodiment of a device in accordance with the invention.

The figures, in which basically the same reference numbers are used for the same elements, show different embodiments for placing or applying strip-shaped material in a very basic manner that are components of a machine or of an automatic machine.

Furthermore, an object is shown in FIG. 3 in a very basic manner onto which the strip-shaped material is to be placed on or adhered on. In the exemplary embodiment a section of a frame is concerned in whose inner side or in whose fold an adhesive band is to be placed, in particular also in the corner areas, that is, in the sections to be designated as critical areas that can be provided in automatic production systems only with a significant constructive expense and thus in part only insufficiently with an adhesive strip.

The device 10 according to FIGS. 1 to 3 comprises a holder that can also be designated as base plate or carrier plate 12. A pivoting arm 16 emanates from a shaft 14 designated as the third shaft from the plate 12, that can be fastened, e.g., on a manipulator such as a robotic arm, about which shaft the pivoting arm 16 can pivot. This pivoting takes place via a motor 38, that is also designated as the second drive and that is fastened such as flanged on the base plate 12. A shaft 18 designated as the second shaft emanates from the pivoting arm 16, namely, from its area remote from the shaft 14, from which shaft 18 a pivoting element designated as, e.g., pivoting lever 20 emanates that comprises in the exemplary embodiment in the lateral view shown an L-shape with a longitudinal shank 22 and a transverse shank 24. A drive 26 emanates from the transverse shank 24 via which the strip-shaped material shown in FIG. 2 is transported by a transport roller or drive roller 27 which material is an adhesive band 28 with liner 29 in the exemplary embodiment. The liner 29 is grasped by the drive roller 27. To this end the liner 29 is guided between the drive roller 27 and a roller 32 in order to be transported by frictional connection. The strip-shaped material was previously guided around a pressure roller 30 running in the area of the free end of the longitudinal shank 22.

As a result of the fact that the transport roller 27 emanates from the pivoting lever 20, the former is located relatively close to the pressure roller 30 with the consequence that an expansion of the liner 29 between the pressure roller 30 and transport roller 27 does not occur or occurs only in a manner that cannot be noticed with the consequence that the adhesive band 28 can be placed or applied in a reproducible manner onto the object or the contact area.

The pivoting lever 20 is actively pivoted, namely, in the exemplary embodiment of FIGS. 1 to 3 via the pivoting arm 16 that for its part is actively pivoted by the motor 38.

Furthermore, the pivoting lever 20, i.e., in the exemplary embodiment its longitudinal shank 22, comprises a longitudinal slot 34 through which a pin 36 emanating from the base plate 12 runs. Conditioned by this, the pivoting lever 20 also completes a linear movement upon a pivoting movement about the shaft 18 in addition to the pivoting movement.

The pressure roller 30 performing the function of a pressure element is rotatably arranged in the front end area of the pivoting lever 22, which pressure roller is connected via a holder 40 to the longitudinal shank 22 of the pivoting arm 20. Furthermore, a guide roller 44 emanates from the pivoting arm 22 underneath the pressure roller 30 which guide roller comprises, parallel to the pressure roller 30, a set-back area 46 as guide for the adhesive band 28 with the liner 29 in front of the pressure roller 30 and as guide for the liner 29 after the pressure roller 30—viewed in the direction of transport. It furthermore results from the drawings that the strip-shaped material in the form of the adhesive band 28 and of the liner 29 drawn off from a roll (not shown) is guided over deflection rollers 48, 50 and the liner 29 is guided over deflection rollers 52, 54 after the application of the adhesive band 28, whereby the liner 29 is applied to a liner winding device such as a liner winding roller after having left the deflection roller 54.

Furthermore, a cutting device 56 with associated cutting table 58 emanates from the pivoting lever 20 between which the adhesive band 28 with the liner 29 is guided in order to separate the adhesive band 28 as a function of the adhesive band length to be applied without the liner 29 being cut through.

The device 10 in accordance with the invention makes it possible, due to the cooperation of the pivoting arm 16 and of the pivoting lever 20, that the pressure roller 30 is pivoted about the shaft 18 with a simultaneously superposed linear movement, due to the engagement of the pin 36 into the longitudinal hole or the longitudinal slot 34, in such a manner to an area 60 of an object designated as the contact area, that corners or recesses or similar areas that are possibly difficult to access can be readily provided with the adhesive band 28 to the required extent. It is ensured here independently of the pivoting position of the pivoting arm 16 that the pressure roller 30 and therewith the adhesive band 28 is always in contact with the contact area 60, that is shown in FIG. 2 as a straight line. That is, the required pressure loading takes place in order that the adhesive band 28 clings to the contact area 60 and that the liner 29 can be drawn off from the adhesive band 28.

In the exemplary embodiment of FIG. 3 the carrier plate 12 is moved by a robot (not shown) along the inside 62 of a frame 64 that has corners 66, 68 in which the adhesive band 28 is be applied in an adhesive manner. The direction of application of the adhesive band 28 with the liner 29 is characterized by the arrow 70.

In order to provide the corner 66 with the adhesive band 28, the base plate 12 is adjusted at first in such a manner that the pressure roller 30 is moved along the shank 72, running vertically in FIG. 3, in the direction of the arrow 74. The pressure roller 30 is located relative to the shaft 18 behind the shaft 18 viewed in relation to the direction of application 70. In this position (position A) the pressure roller 30 can be readily guided along the inside of the shank 72 and through the corner 66. Then, the base plate 12 is moved in such a manner that the pressure roller 30 is moved along the inside 62 of the longitudinal shank 76 of the frame 64, during which the adhesive band 28 is applied.

As the doted-line view (position B) illustrates, during the movement of the base plate 12 the pivoting lever 20 is moved in such a manner by pivoting the pivoting arm 16 that this lever is moved in the direction of application 70, that is, counterclockwise in the exemplary embodiment. Regardless of the circular movement of the pressure roller 30 conditioned by this, the baseplate 12 can be moved parallel to the longitudinal shank 76 since the pivoting movement of the pivoting lever 20 is superposed by the linear movement. This is made possible by the engagement of the pin 36 into the longitudinal slot 34. Thus, the pivoting lever 20 can execute a lifting movement relative to the longitudinal shank 22. In the dotted-line view in FIG. 3 (position B) the pressure roller 30 is in a position in which the longitudinal slot 34 runs approximately vertically to the level surface 62 of the longitudinal shank 76 of the frame 64. For the rest, the longitudinal slot 34 runs approximately in the longitudinal direction of the longitudinal shank 22, as results from the drawings. The longitudinal slot 34 can also be characterized in its course in that it runs along the connection line between the pivoting shaft 18 of the pivoting lever 20 and between pressure roller 30.

In order that adhesive band 28 can also be applied in the corner 68 of the frame 64, which corner is on the left in the drawings, without a changeover of the baseplate 12, the pivoting lever 20 is rotated further counterclockwise (position C) upon a further movement of the baseplate 12 in the direction of the corner 68 by pivoting the pivoting arm 16 in order to be able to apply the adhesive band 28 in the corner 68 in an unhindered manner and then onto the following longitudinal shank 78. Consequently, the pressure roller 30 is located in front of the shaft 18, viewed in the direction of application 70.

As results from the representation of the drawings, the pressure roller 30, the rollers 50, 44, the drive roller 27 and the other rollers 32, 52, 54 project laterally over the base plate 12 so that even a circumferential frame can be easily provided with an adhesive band 28, since the base plate does not represent a hindrance.

In order to be able to apply the adhesive band 28 without tension or with a desired, given tension onto the object—in the exemplary embodiment onto the frame 64—the transport of the adhesive band 28 with the liner with the liner 29 via the control of the robot moving the base plate 12 is regulated in such a manner that the transport stretch per unit of time on the stretch of the base plate traversed in the unit of time to the object and of the pivoting movement of the pivoting lever 20 that took place during this unit of time is taken into consideration. Consequently, if the pivoting lever 20 is pivoted in the direction of application 70 of the adhesive band, that is, from the position B into the position C, the transport roller 27 is driven in such a manner by the motor or the drive 26 that the length of the adhesive band 28 with the liner 29, which length is transported per unit of time, is longer than the stretch that the baseplate 12 traverses relative to the application area of the object in the same unit of time. In addition, the stretch resulting by the relative movement between the baseplate 12 and the pressure roller 30 on account of the pivoting movement in the given unit of time is considered. Inversely, the length of the strip-shaped material to be applied is less than the traversed stretch of the baseplate 12 if a pivoting occurs during the movement of the pivoting lever 20 counter to the direction of application 70, that is, clockwise in the exemplary embodiment.

The application area does not have to run in straight line but rather can also include, e.g., an arc running in a plane.

However, the teaching in accordance with the invention is also not departed from if the pivoting lever exclusively executes a pivoting movement. In this case the connection to a pivoting arm is superfluous but rather the pivoting lever can be pivoted directly about a shaft emanating from a holder. This is to be explained using the FIGS. 4 to 6.

In the exemplary embodiment of FIG. 4, a holder 112 from which a pivoting lever 120 corresponding to the pivoting lever 20 emanates and which can pivot about a shaft 110 emanating from the holder 117 and is designated as the first shaft, can be moved by a cylinder such as a pressure cylinder 122 in order to realize the stroke as it is realized according to the exemplary embodiment of FIGS. 1 to 3 by the engagement of the pin 36 emanating from the baseplate 12 into the longitudinal slot 34 of the pivoting lever 20. The pressure cylinder 122, that can emanate from a carrier 124, therefore compensates the change of distance of the pressure roller 130 relative to an object (not shown) which change otherwise results during the pivoting of the pivoting lever 120.

In the exemplary embodiment of FIG. 5 the holder 112 is pretensioned opposite a carrier 124 by a spring element 126 in such a manner that the holder 112 can deviate when the pivoting lever 120 is pivoted.

The embodiment of FIG. 6 represents another variant for achieving the required stroke in order to make possible the pivoting movement of the pivoting lever 120 without the required, uniform pressure loading of the pressure roller 130 onto a strip-shaped material for the application onto an object being changed or that a pivoting on account of the object would be impossible. Thus, a spindle drive 128 emanates from a carrier 124 that is connected to the holder 112 and therefore the desired and required stroke becomes possible.

In the exemplary embodiments of FIGS. 4 to 6 the pivoting lever is directly driven in order to be pivoted. This pivoting takes place via a drive that is connected, e.g., to the control of the manipulating device such as a robot by means of which the holder is guided along the object onto which the material is to be applied. The pivoting movement can be preprogrammed if the movement of the robot and the geometry in the area of the object is known onto which the material is to be applied.

In the exemplary embodiment of FIGS. 1 to 3 an indirect, active activation of the pivoting element 12 from which the pressure roller 30 emanates takes place, namely, via the pivoting arm 16 which for its part is adjusted by the motor 38 such as an electromotor.

Based on the teaching of the invention, recesses or corners of objects can be readily provided in a uniform fashion with a strip-shaped material. Here, not only an adhesive band is concerned that is transported by a carrier band such as a liner. Even a seal comprising a carrier band which seal is introduced, e.g., into a frame or into a groove can be placed based on the teaching in accordance with the invention. However, all these examples are to be understood as non-limiting. The same applies to the concept of carrier band.

LIST OF REFERENCE NUMERALS 10 device
12 baseplate
14 shaft
16 pivoting arm
18 shaft
20 pivoting lever
22 longitudinal shank
24 transverse shank
26 drive
28 adhesive band
29 liner
30 pressure roller
32 roller
34 longitudinal slot
36 pin
38 drive
40 holder
44 guide roller
46 area
48 deflection roller
50 deflection roller
52 deflection roller
54 deflection roller
56 cutting device
58 cutting table
60 contact area
62 inner side
64 frame
66 corner
68 corner
70 arrow
72 shank
74 arrow
76 longitudinal shank
110 shaft
112 holder
120 pivoting lever
122 cylinder
124 carrier
128 spindle drive
130 pressure roller

The invention claimed is:

1. A method for applying a material onto a contact area of an object, the method comprising:
providing a holder with a pivoting element directly or indirectly pivotably connected to the holder;
providing a drive to directly pivot the pivoting element;
providing a pressure element associated with the pivoting element;
feeding the material to the pressure element while applying the material, so that the pivoting element is pivoted via the drive in a direction of application of the material onto the contact area, or counter to the direction of application of the material onto the contact area, using the pressure element;
pivoting the pivoting element during the applying step;
moving the pivoting element relative to the holder; and
moving the pivoting element away from the object during the pivoting step to allow the material to contact the object.

2. The method of claim 1, wherein the pivoting element is moved relative to the holder during the lifting step.

3. The method of claim 1, wherein the lifting step is carried out by the holder.

4. The method of claim 1, further comprising:
providing a drive to transport the material to the pressure element; and
regulating a transport length of the material using the drive, as a function of the relative movement between the holder and the contact area, and as a function of the pivoting movement during a contact between the pressure element and the contact area.

5. The method of claim 1, further comprising:
providing a manipulating device;
configuring the manipulating device to move at least one of the holder and the object; and
regulating the drive by controlling the manipulating device.

6. The method of claim 1, further comprising:
providing a pivoting arm and configuring the pivoting arm to pivot about a first shaft emanating from the holder
providing a pivotable connection between the pivoting arm and the pivoting element via a second shaft emanating from the pivoting arm;
providing a longitudinal slot in the pivoting element;
providing a projection on the holder, and engaging the projection in the slot; and
pivoting the pivoting element about the second shaft.

7. The method of claim 1, further comprising:
providing an actuating element; and
moving the holder transversely to the contact area using the actuating element.

8. The method of claim 7, wherein the actuating element is selected from the group consisting of a cylinder, a spring, and a spindle.

9. The method of claim 1, comprising applying the material in a corner area of the object.

10. The method of claim 9, comprising applying the material in two corner areas of the object.

11. A device for the application of a material onto a contact area of an object, the device comprising:
a holder configured to move relative to the object;
a shaft emanating from the holder;
a pivoting element pivotably connected to the holder via the shaft;
a first drive configured to transport the material;
a pressure element emanating from the pivoting element and configured to receive the material and to apply the material onto the contact area by pressure loading;
wherein the pivoting element is directly pivoted via a second drive about the shaft in a direction of application of the material onto the object, or counter to the direction of application of the material onto the object; and
wherein the holder is configured to be moved transversely to the contact area during the application of the material onto the object.

12. The device according to claim 11, further comprising an actuating element configured to move the holder relative to the contact area.

13. The device according to claim 11, wherein the actuating element is selected form the group consisting of a cylinder, a spring, and a spindle.

14. The device according to claim 11, further comprising a manipulating device configured to adjust at least one of the holder and the object;
    wherein the first drive is regulated to transport the material, as a function of the relative movement between the object and the holder, and of the pivoting movement of the pivoting element during the application of the material to the object.

15. The device according to claim 11, further comprising a cutting element emanating from the pivoting element.

16. The device according to claim 11, further comprising a second drive emanating from the holder, wherein the second drive pivots the pivoting element.

17. The device according to claim 11, wherein the pivoting element carries out an overlapping of pivoting and linear movements.

18. A device for the application of a material onto a contact area of an object, the device comprising:
    a holder configured to move relative to the object;
    a first shaft emanating from the holder;
    a pivoting arm pivotably connected to the first shaft;
    a second shaft emanating from the pivoting arm, about which second shaft, a pivoting element pivots;
    a first drive configured to transport the material;
    a second drive configured to directly pivot the pivoting arm;
    a pressure element emanating from the pivoting element and configured to receive the material and to apply the material onto the contact area by pressure loading;
    a longitudinal slot in the pivoting element;
    a projection on the holder;
    wherein the projection is engaged in the slot.

19. The device according to claim 18, further comprising an actuating element configured to move the holder relative to the contact area.

20. The device according to claim 18, wherein the longitudinal slot runs along a connection line between the second shaft and the pressure element.

21. The device according to claim 18, further comprising a manipulating device configured to adjust at least one of the holder and the object;
    wherein the first drive is regulated to transport the material as a function of the relative movement between the object and the holder, and of the pivoting movement of the pivoting element during the application of the material to the object.

22. The device according to claim 18, wherein the first drive emanates from the pivoting element.

23. The device according to claim 18, further comprising a cutting element emanating from the pivoting element.

24. The device according to claim 18, wherein the second drive emanates from the holder, and wherein the second drive pivots the pivoting element associated with the pivoting arm.

* * * * *